April 24, 1956 — T. B. FUNK — 2,742,750
LAWN MOWER CONSTRUCTION
Filed Jan. 9, 1952 — 2 Sheets-Sheet 1
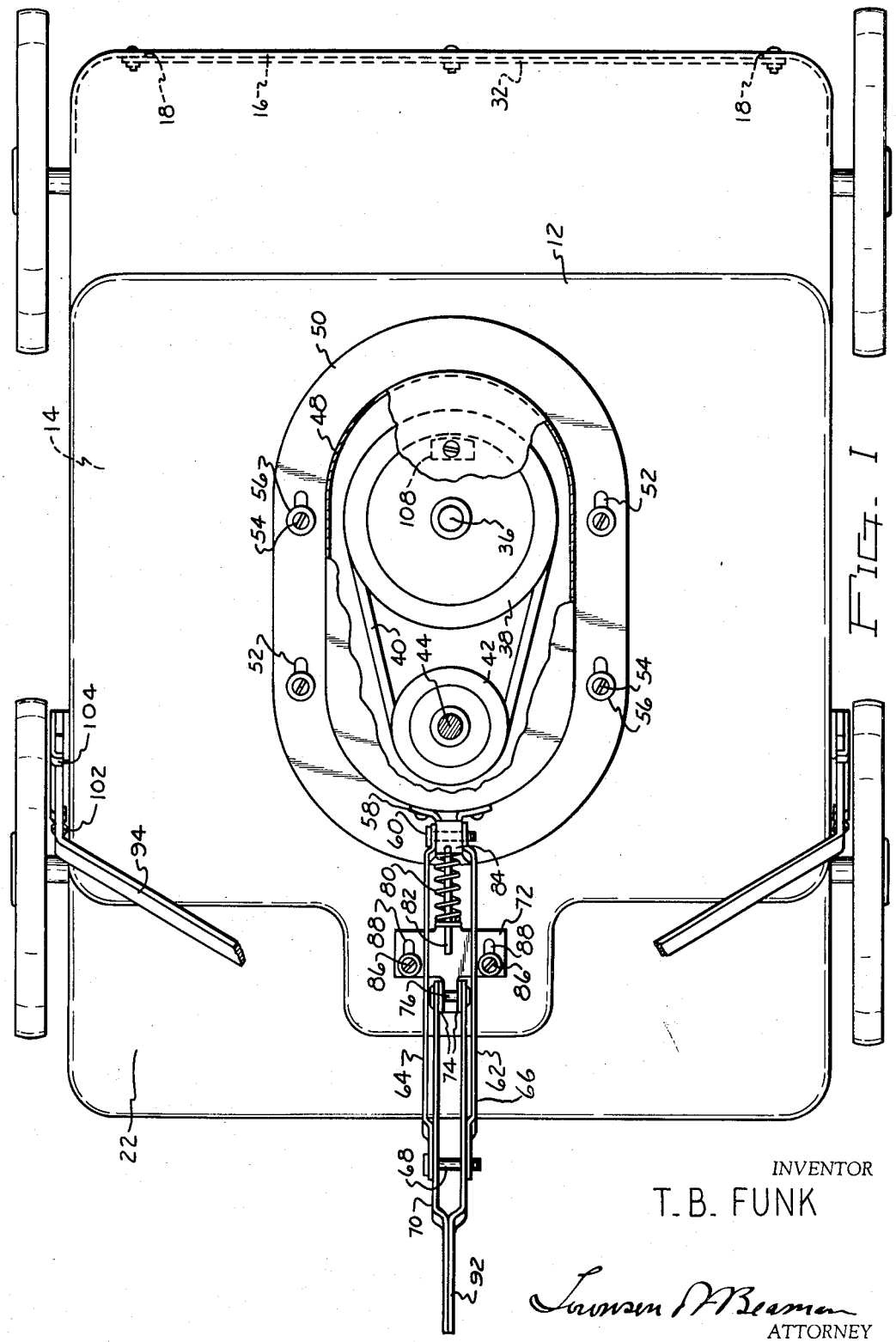
INVENTOR
T. B. FUNK
ATTORNEY

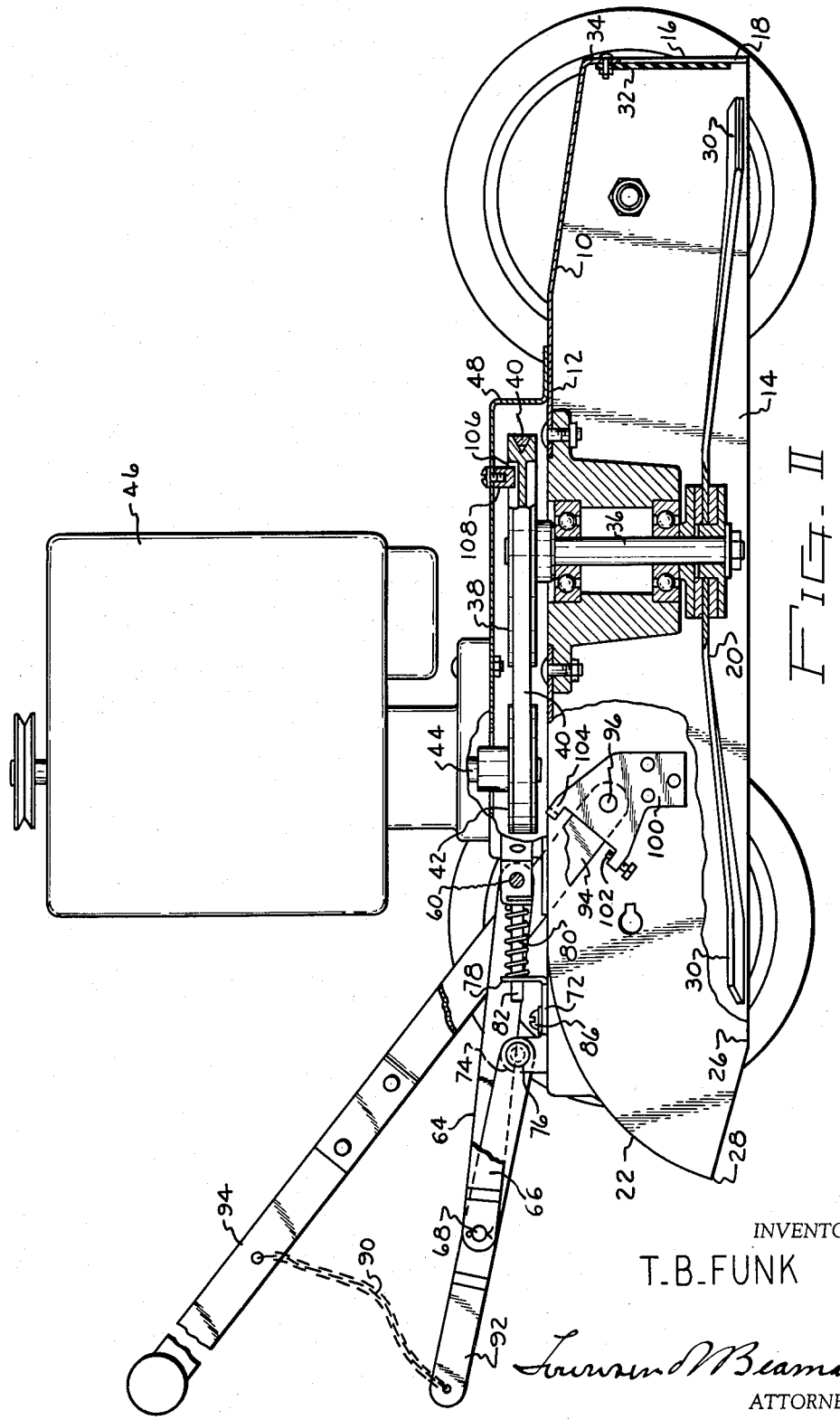

United States Patent Office 2,742,750
Patented Apr. 24, 1956

2,742,750

LAWN MOWER CONSTRUCTION

Truman B. Funk, Jackson, Mich., assignor to Yard-Man, Inc., Jackson, Mich., a corporation of Michigan Application January 9, 1952, Serial No. 265,599

1 Claim. (Cl. 56—25.4)

The present invention relates to improvements in lawn mowers of the type in which the cutting is performed by a rotating blade or knife acting substantially parallel to the ground; the blade or knife being rotated about an axis substantially normal to the ground.

Lawn mowers of the aforesaid type must be well shielded to protect the operator from the cutting element as well as from objects which may be projected by contact with the rapidly rotating cutting element. At the same time, the shielding structure must be such as to admit grass and weeds to the cutting element and to be capable of discharging the grass and weeds cut so as to avoid any accumulation which would otherwise affect the efficiency of the mower.

In practice, lawn mowers of the type described usually employ a fractional horsepower internal combustion engine to drive the vertical shaft to which the blade or knife is attached at the lower end. Either the vertical shaft carrying the blade or knife is a direct extension of the drive shaft of the engine or it is directly belted to the drive shaft of the engine without any declutching arrangement. Thus, when the engine is to be cranked to start the same, the shaft carrying the blade or knife is rotated with the blade engaging the grass to resist rotation of the engine and starting becomes difficult. Also, the operator's feet, during the cranking operation of the engine, are normally dangerously positioned relative to the rotating blade or knife due to the necessity of standing relatively close to the mower.

According to the present invention, effective shielding of the cutting element has been provided without impairing the efficiency of a mower's operation. Also, a declutching arrangement has been provided which gives maximum protection to the operator and greatly facilitates the starting of the engine. Preferably, the engine is declutched from the cutting element and a brake applied thereto by the simple action of raising the handle of the mower beyond its normal range of movement employed in guiding the mower over the ground. Thereafter, no movement of the handle, deliberate or accidental, is capable of clutching the engine to the cutting element. To clutch the engine and cutting element a separate and distinct manual operation is required.

Thus, one of the objects of the present invention is to provide an effective shielding structure in a mower of the type described while improving the efficiency of operation over existing designs.

Another object of the invention is to provide an improved arrangement for clutching and declutching the engine with respect to the cutting element in mowers of the type described.

Another object is to provide an arrangement for declutching the engine from the cutting element which is actuated by raising the handle of the lawn mower yet does not interfere with the operation of raising the front end of the mower by depressing the handle or result in inadvertent or accidental clutching through handle manipulation.

A further object resides in providing an improved arrangement for declutching and braking the cutting element of a lawn mower of the type described.

These and other objects residing in the combination, construction and arrangement of parts as disclosed, and equivalent structure, will more fully appear from a consideration of the following specification and the appended claims.

In the drawings,

Fig. I is a plan view of a lawn mower embodying the principles of the present invention, the engine being shown removed for purposes of disclosure, and Fig. II is a side elevational view of the construction shown in Fig. I showing the engine in position but with the wheels removed on one side and parts of the structure shown in broken cross-section.

Referring to the drawings, the improved shielding of the cutting element takes the form of a main sheet metal housing 10, substantially rectangular in horizontal section and having a central generally flat top portion 12, vertical side walls 14, a vertical front wall 16 with an elongated frontal opening 18 corresponding generally in width to the diameter of the cutting element 20, and a slightly rearwardly flared back wall 22. It will be noted from Fig. II that the lower edge of the side wall 14 has a slightly upward and rearward taper from the point 26 to meet the lower edge 28 of the back wall 22 slightly above the horizontal plane in which the outward ends 30 of the cutting element rotate. A flexible curtain 32, preferably of sheet rubber, is attached along the upper edge 34, of the frontal opening 18. The forward movement of the mower into the grass will cause the curtain 32 to swing back over the plane of rotation of the ends 30 of the cutting element 20. The curtain 32 offers very little resistance to movement of the mower yet it provides an effective shield against grass and objects outwardly thrown by the action of the cutting element 20. Also, the curtain 32 will hang vertically with the mower out of motion and will indicate the location of the cutting element to a person standing adjacent the mower.

The driven shaft 36 which carries the cutting element 20, has a V-grooved pulley 38 at its upper end driven by the V-belt 40. A pulley 42 on the lower end of the drive shaft 44 of the engine 46 drives the pulley 38 through the belt 40 when the mounting base 48 for the engine 46 is shifted to the left, as viewed in Fig. II, to tighten the belt 40.

The mounting base 48, as shown, takes the form of an inverted dish-shaped stamping having a flange 50 for slidably supporting the same upon the flat top portion 12 of the housing 10. Elongated openings 52 in the flange 50 receive the bolts 54 carrying washers 56 to provide limited sliding movement between the mounting base 48 and the housing 10. As will clearly appear from Figs. I and II the base 48 completely houses the pulleys 38 and 42 thus preventing grass, moisture and other matter from interfering with the operation of the belt 40.

At one end of the base 48 is the bracket 58 carrying a pin 60 above which a double-armed lever 62, having portions 64 and 66, is hinged at one end with the opposite end being connected to the hinged pin 68 on the forked lever 70.

An adjustable bracket 72 has upright portions 74 carrying a hinged pin 76 to which the inner end of the forked lever 70 is connected. Also, on the bracket 72 is an abutment 78 for the spring 80 mounted on the guide 82 and re-acting against the spacer 84 carried on the pin 60. Bolts 86 located in elongated slots 88 permit the bracket 72 to be adjusted relative to the mounting base 48.

In Fig. II the lever 70 is shown raised with a straight line between the axis of the pins 60 and 68 being located above the axis of the pin 76. A flexible chain 90 of proper length is connected between the outer end 92 of the lever 70 and the conventional hinged handle 94 of the mower and may be employed to raise the lever 70 by raising the handle 94 about its pivot 96 to a point higher than required to guide the mower over the ground. With the lever 70 raised, as shown in Fig. II, the spring 80 reacts against the mounting base 48 to urge the same to the right, as viewed in Fig. II, to slacken the belt 40 to declutch the engine 46 from the driven shaft 36. The handle 94 has a conventional forked end which straddles the housing 10 and is hinged at 96 and the brackets 100 located at opposite sides of the housing 10. Stops 102 and 104 on the brackets 100 limit the pivotal movement of the handle 94; with the handle 94 engaging the stops 102, further downward movement will raise the front end of the mower from the ground. Movement of the handle 94 between the stops 102 and 104 can only declutch the engine from the cutting element 20.

To clutch the shaft 36 to the engine 46, in practice it is preferred to require the operator of the mower to depress the outer end 92 of the lever 70 manually to bring a straight line between the axis of the pins 60 and 68 slightly below the axis of the pin 76. This action results in the base 48 being moved slightly forward as viewed in Fig. II to tighten the belt 40 and further compress the spring 80. With the lever in its "over center" position, the tension of the spring 80 will hold the lever 70 depressed in a well known manner and the belt 40 tight until the lever 70 is raised by the chain 90 to slacken the belt 40 and declutch the engine 46 from the driven shaft 36 upon which the cutting element 20 is mounted. By adjusting the location of the bracket 72 which carries the pin 76, the slack and tension of the belt 40 may be adjusted to take care of wear and stretch.

The pulley 38 is preferably provided with a brake drum portion 106. At the time the lever 70 is raised to declutch the engine, movement of the mounting base 48 to which the brake shoe 108 is attached will bring the brake shoe 108 into engagement with the drum portion 106 with the stress of the spring 80 to brake the pulley 38 and the structure associated therewith, including the cutting element 20.

The ability to clutch and declutch the engine 46 relative to the driven shaft 36 carrying the cutting element 20, materially facilitates the cranking of the engine 46 and reduces the hazards of the operator being injured by the cutting element to a minimum.

Having described my invention what I claim is new and desire to cover by Letters Patent is:

In a lawn mower of the type described having a housing, a driven shaft supported in said housing against relative movement in a horizontal direction and a cutting element carried on said shaft for rotation within said housing, a brake drum upon said driven shaft, a driver means upon said driven shaft, an engine mounting base, an engine on said base, means for shifting said base to clutch and declutch said engine to said driver means on said driven shaft, and a brake shoe on said base engaging with said brake drum with said base shifted into a declutching position.

References Cited in the file of this patent

UNITED STATES PATENTS

| | | |
|---|---|---|
| 1,422,218 | Maimin | July 11, 1922 |
| 2,488,140 | Phillips et al. | Nov. 15, 1949 |
| 2,489,059 | Surgi | Nov. 22, 1949 |
| 2,495,032 | Stuhl | Jan. 17, 1950 |
| 2,530,684 | Davis | Nov. 21, 1950 |
| 2,552,583 | Phelps | May 15, 1951 |
| 2,632,990 | Stricklen et al. | Mar. 31, 1953 |